United States Patent

Wortley

[15] 3,638,505
[45] Feb. 1, 1972

[54] MOTION TRANSFER DEVICE

[72] Inventor: Stewart W. Wortley, 1814 S. Cheyenne, Tulsa, Okla. 74119

[22] Filed: Mar. 11, 1970

[21] Appl. No.: 18,453

[52] U.S. Cl. ................................................74/54, 74/600
[51] Int. Cl. ..................................F16h 25/08, G05g 1/00
[58] Field of Search .......................................74/54, 55, 600

[56] References Cited

UNITED STATES PATENTS

| 2,319,485 | 5/1943 | Alabrune | 74/600 |
| 3,359,809 | 12/1967 | Spender | 74/55 |

*Primary Examiner*—William F. O'Dea
*Assistant Examiner*—Wesley S. Ratliff, Jr.
*Attorney*—William S. Dorman

[57] ABSTRACT

An adjustable motion transfer device for transmitting movement from a drive member to a driven member, and particularly for transferring rotational motion to linear motion. The device is particularly designed for transmitting motion from a power source or motor drive shaft to a pump piston and may be quickly and easily adjusted to provide substantially any desired length of linear movement or reciprocal movement for the pump piston. The device may be connected directly to the drive shaft of the motor and carries an adjustable cam drive member for connection with the pump piston for transmitting the linear motion thereto. The cam drive member may be substantially infinitely adjusted to provide substantially any desired drive or speed ratio between the drive shaft and piston.

5 Claims, 4 Drawing Figures

PATENTED FEB 1 1972
3,638,505
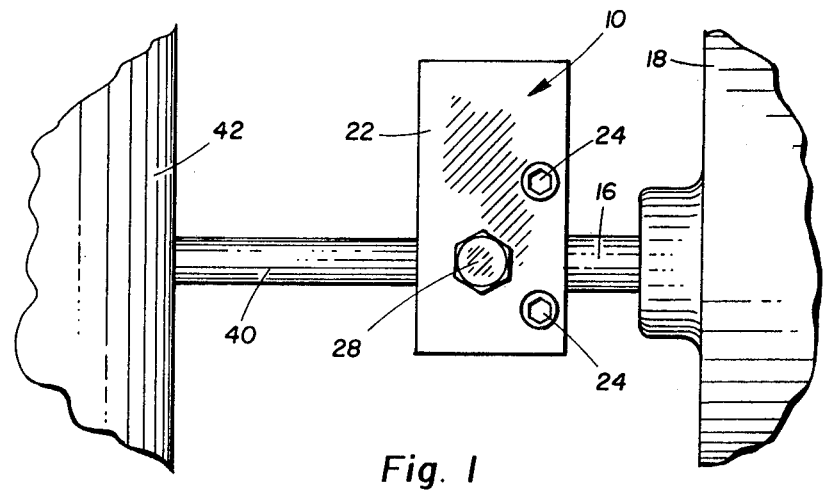
Fig. 1
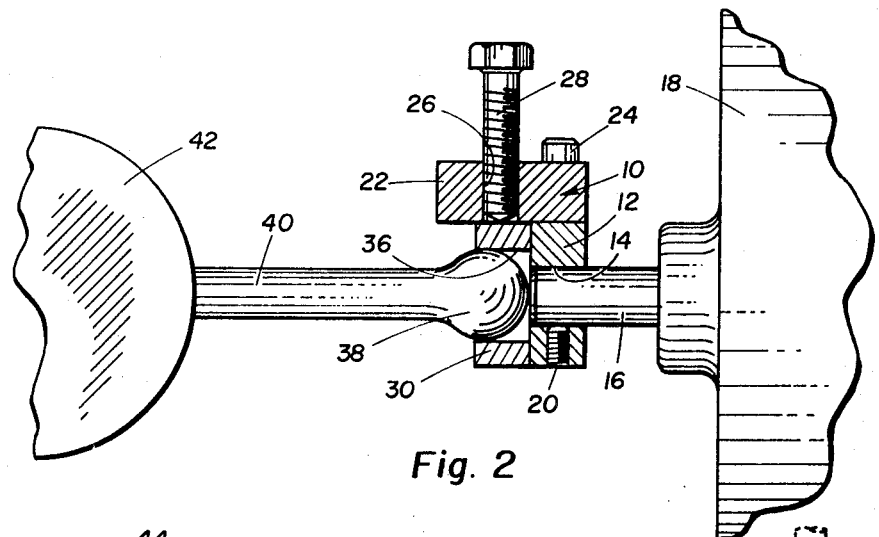
Fig. 2
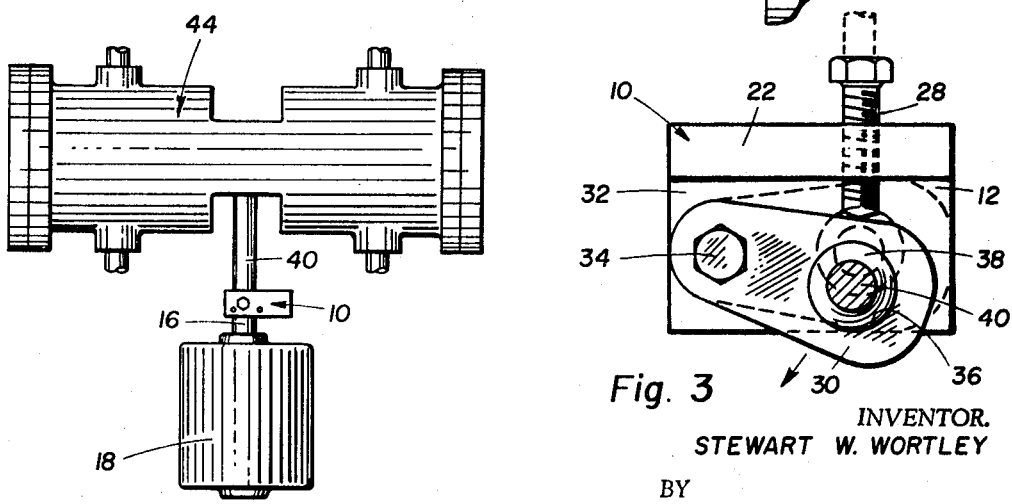
Fig. 4
Fig. 3
INVENTOR.
STEWART W. WORTLEY
BY
William S. Dorman
ATTORNEY

MOTION TRANSFER DEVICE

This invention relates to improvements in motion transfer devices and more particularly, but not by way of limitation, to an adjustable device for translating rotating movement of a drive shaft into linear movement for a pump piston.

In positive displacement pumps, and the like, the pump piston is usually reciprocated by a power source, such as a motor, wherein means is provided between the drive shaft of the motor and the pump piston for changing the rotation of the shaft into linear movement for the piston. The rate of speed of the pump piston and the length of the stroke thereof are directly related with the output or performance of the pump. For example, the pump disclosed in my prior U.S. Pat. No. 3,453,968, issued July 8, 1969, and entitled "Positive Displacement Pump" includes piston means reciprocated by a drive extension or arm member engaged or connected with the drive shaft of a motor by a cam member. The length of stroke and speed of reciprocation of the piston is determined by the offset of the cam member or the distance between the axes of the drive shaft and connecting arm. Whereas the pump may be designed for meeting desired work requirements, it has been found that an adjustment between the drive shaft and connecting arm would provide a great versatility of use for a single pump design not otherwise possible.

The present invention contemplates a novel motion transfer device particularly designed and constructed for providing an adjustment between the output or drive shaft of a motor and the connecting arm for driving the piston of a pump such as shown in my aforementioned prior patent. However, it is to be noted that the motion transfer device may have other uses than that particularly set forth herein relating to my pump apparatus. The device comprises a support bracket adapted to be secured to the drive shaft of the motor for rotation simultaneously therewith. A cam arm is pivotally secured to the support bracket and provided with means for connection with the extension arm of the pump piston. An adjustment member is provided between the support bracket and pivotal cam arm for adjustment of the position of the cam arm whereby the distance between the axes of the drive shaft and extension arm may be varied at will. This provides a substantially infinite adjustment for the stroke and speed of the piston member completely independent of the pump structure and without the necessity of any disassembly of the pump, extension arm, or motor. In addition, the adjustment may be accomplished without interruption of the pump operation. The novel motion transfer device may be easily installed for operation, and in no manner interferes with the normal operation of the motor or pump equipment.

It is an important object of this invention to provide a novel motion transfer device for translating rotational motion from a drive shaft to linear motion for a reciprocating member.

It is another object of this invention to provide a novel motion transfer device which may be quickly and easily adjusted to regulate the length of the stroke and speed of travel of a reciprocating element which is driven by a rotating element.

Another object of this invention is to provide a novel adjustable motion transfer device for connection between a drive motor and reciprocal pump piston wherein the stroke and speed of the piston may be quickly and easily infinitely adjusted.

Still another object of this invention is to provide a novel adjustable motion transfer device for connection between a motor and pump piston whereby the stroke of the piston may be adjusted completely independently of the pump structure itself.

A still further object of this invention is to provide a novel adjustable motion transfer device for connection between a motor drive shaft and a pump piston wherein the stroke of the piston may be readily adjusted without interruption of the pump operation.

Still another object of this invention is to provide a novel adjustable motion transfer device which is simple and efficient in operation and economical and durable in construction.

Other and further objects and advantageous features of the present invention will hereinafter more fully appear in connection with a detailed description of the drawings in which:

FIG. 1 is a plan view of a motion transfer device embodying the invention and interposed between a motor drive shaft and pump piston extension arm.

FIG. 2 is a sectional elevational view of a motion transfer device embodying the invention and interposed between a motor drive shaft and pump piston extension arm with portions depicted in elevation for purposes of illustration.

FIG. 3 is a side elevational view of a motion transfer device embodying the invention with portion thereof depicted in dotted lines for purposes of illustration.

FIG. 4 is a schematic view of a pump and motor having a motion transfer device embodying the invention interposed therebetween.

Referring to the drawings in detail, reference character 10 generally indicates a motion transfer device comprising a first block member 12 having a bore 14 extending transversely therethrough for receiving a drive shaft 16 or motor 18, or the like, therein. The block 12 may be removably secured to the shaft 16 in any well-known manner, such as by a set screw 20. A second block member 22 is removably secured to one longitudinal edge of the block 12 by a plurality of spaced screws 24. It will be apparent that the block 22 may be secured to either of the opposite longitudinal edges of the block 12 and is not limited to the particular edge depicted in the drawings. The block 22 extends substantially perpendicularly outwardly from the block 12 in a direction away from the motor 18, as depicted herein. A threaded bore 26 extends transversely through the block 22 and is spaced from the block 12 for receiving an adjusting screw 28 therethrough.

An elongated adjuster arm 30 is pivotally secured at one end to one face 32 (FIG. 3) of the block 12 by a pivot pin member 34. The adjuster member 30 is disposed substantially parallel with respect to the face 32 of the block 12 and slides freely along the face 32 during pivoting about the pivot pin 34. Of course, movement of the 30 in one direction is limited by engagement thereof with the block 22 whereas movement thereof in an opposite direction is substantially unlimited. A bore or recess 36 is provided in the adjuster 30 in substantial axial alignment with and spaced from the pivot pin 34. One end 38 of an extension arm 40 is loosely disposed in the bore 36 for relative movement between the end 36 and adjuster 30 for a purpose and in a manner as will be hereinafter set forth. The extension arm 40 is carried by or connected with a reciprocal member or pump piston 42 of a pump generally indicated at 44. The pump 44 may be of any desired type and as depicted herein is similar to that disclosed in my aforementioned patent. The longitudinal edge of the adjuster member 30 extends beyond the threaded bore 26 of the block 22 and the adjustment screw 28 extends into engagement with the edge of the cam 30 for a purpose as will be hereinafter set forth.

In order to translate the rotational motion of the drive shaft 16 into linear movement for the piston 42 of the pump 44, the motion transfer device may be interposed therebetween as follows. The block 12 may be secured around the outer end of the drive shaft 16 by the set screw 20 whereby the entire device 10 will be rotated simultaneously with the drive shaft upon actuation of the motor 18. The block 22 may be secured to either of the oppositely disposed longitudinal edges of the block 12 by the screws 24. The head or end member 38 of the arm 40 may then be disposed within the bore or recess 36, thus connecting the piston 42 with the drive shaft 16. The piston 42 is normally of a substantially circular or cylindrical configuration and may be readily rotated about the longitudinal axis thereof for facilitating disposition of the end member 38 within the bore 36.

When the adjuster member 30 is disposed adjacent the inwardly directed surface of the block 22 as depicted in FIG. 2, and in dotted lines in FIG. 3, the axes of the drive shaft 16 and arm 40 will be in substantial alignment. In this position of the adjuster member 30 the axis of rotation for the device 10 will be the axis of the bore 36 and since the end member 38 is loosely disposed therein, the device 10 will rotate with the drive shaft 16, but no movement will be transmitted to the arm 40. Thus, in this relative position between the drive shaft 16 and arm 40 no movement will be transmitted to the piston 42. This aligned position for the axes of the shaft 16 and arm 40 may be considered as a "neutral" position for the device 10.

In order to transmit a relatively slight linear movement or reciprocal movement to the piston 42, the adjusting screw 28 may be rotated slightly for moving the outer end thereof a relatively small distance beyond the inwardly directed face of the block 22. Of course, the engagement of the end member 38 with the bore 36 tends to resist any movement of the adjuster member 30 for maintaining the edge of the cam member in constant engagement with the outer end of the screw 28 but relatively little force is required on the screw 28 for pivoting of the adjuster member 30 about the pivot pin 34 in the direction indicated by the arrow in FIG. 3. As soon as the bore 36 and arm 40 are moved sufficiently for creating an offset relationship between the axes of the arm 40 and shaft 16, a cam action will be provided for the cam arm 30 as the device 10 rotates with the shaft 16. The axis of the arm 40 will move in a circular path about the axis of the shaft 16 thus causing the arm 40 to move through a circular path. As hereinbefore set forth and as described in detail in my aforementioned patent, this circular movement of the arm 40 causes the piston 42 to move in a combined oscillatory and reciprocal movement within the pump 44 to provide the resulting pumping action therefor.

It will be readily apparent that the greater the "throw" of the adjuster member 30, or the greater the distance between the axis of the shaft 16 and the axis of the bore 36 and arm 40, the greater or longer the stroke or linear movement of the piston 42. Of course, the longer the stroke, the greater the length of time for a complete stroke of the piston, and the shorter the stroke, the shorter the length of time for a complete stroke of the piston.

The threads of the adjusting screw 28 may be relatively fine, thus providing an extremely fine adjustment for the movement of the adjuster arm 30. In this manner, substantially an infinite adjustment is possible for the stroke of the piston 42. In addition, the head of the adjusting screw 28 may be quickly and easily manually rotated during operation of the pump 44 to provide slight adjustments for the piston without interruption of the operation thereof, thus providing for a very fine control of the operation of the pump.

As hereinbefore set forth, the connection of the end 38 of the arm 40 in the recess 36 tends to maintain the cam arm in its uppermost position against the block 22. Accordingly, when the adjusting screw 28 is backed off to move the axis of the arm 40 into closer relationship with the axis of the drive shaft 16, the cam arm will inherently follow the adjusting screw.

Whereas the particular installation of the device 10 as depicted herein discloses the block 12 as being secured directly to the drive shaft 16, and the end member 38 of the arm 40 being loosely disposed in the bore 36, it is to be noted that the device 10 may be reversed, if desired. For example, the bore 36 of the adjuster arm 30 may be secured directly to the drive shaft 16 by a setscrew, or the like, and the end 38 of the arm 40 may be loosely disposed within the bore 14 of the block 12. The adjustment action and end result would be the same as hereinbefore set forth.

From the foregoing it will be apparent that the present invention provides a novel adjustable motion transfer device particularly designed and constructed for translating rotational motion into linear movement. The novel device may be interposed between the drive shaft of a motor and the actuating arm of a pump piston and is provided with a cam adjuster arm member which may be adjusted to vary the distance between the axis of the drive shaft and the axis of the actuating arm to provide substantially any drive ratio between the drive shaft and piston. The novel device provides for quick and easy adjustment of the length of stroke of the piston through a substantially infinite range thus permitting an accurate control for the operation of the piston and pump.

Whereas the present invention has been described in particular relation to the drawings attached hereto, it should be understood that other and further modifications, apart from those shown or suggested herein, may be made within the spirit and scope of this invention.

What is claimed is:

1. In combination with a rotatable drive shaft and a connecting arm of a reciprocal member, a motion transfer device comprising first means secured to the drive shaft for rotation simultaneously therewith, movable means pivotally secured to said first means, one end of the connecting arm being loosely engaged with the movable means, adjusting means carried by the first means and engageable with the movable means for pivoting thereof with respect to the first means for varying the distance between the axes of the drive shaft and connecting arm for adjusting the stroke of the reciprocal member.

2. In combination with a rotatable drive shaft and a connecting arm of a reciprocal member, a motion transfer device as set forth in claim 1 wherein the first means comprises a substantially rectangular block member removably secured to the drive shaft for rotation simultaneously therewith, and said movable means comprises an adjuster arm pivotally secured adjacent one face of the block member with the pivot connection being offset with respect to the drive shaft, said adjuster arm being provided with means for loosely receiving one end of the connecting arm therein, and said adjuster arm being pivoted by the adjusting means to vary the position of the connecting arm with respect to the drive shaft for adjusting the stroke of the reciprocal member.

3. In combination with a rotatable drive shaft and a connecting arm of a reciprocal member, a motion transfer device as set forth in claim 1 wherein the adjusting means comprises a block member removably secured to the said first means, and an adjusting screw extending transversely through the block member into engagement with the movable means for selective pivotal movement thereof with respect to the first means to provide for said varying distance between the axes of the drive shaft and connecting arm.

4. In combination with a rotatable drive shaft and a connecting arm of a reciprocal member, a motion transfer device as set forth in claim 1 wherein the movable member comprises an adjuster arm member pivotally secured to said first means, said adjuster arm having recess means provided therein for loosely receiving one end of the connecting arm therein, said adjuster arm member being pivoted by said adjusting means for varying the distance between the axis of the connecting arm and the axis of the drive shaft for adjusting the stroke of the reciprocal member.

5. In combination with a rotatable drive shaft and a connecting arm of a reciprocal member, a motion transfer device as set forth in claim 1 wherein the first means comprises a first block member removably secured to the drive shaft for rotation simultaneously therewith, said movable means comprises an adjuster arm pivotally secured adjacent one face of the block member with the pivot connection being offset from the drive shaft, said adjuster arm being provided with recess means for loosely receiving one end of the connecting arm therein, and said adjusting means comprises a second block member removably secured to the first block member and extending substantially perpendicularly therefrom in a direction toward the adjuster arm, and an adjusting screw extending transversely through the second block member and engageable with the adjuster arm for pivoting thereof to vary the relative distance between the axes of the connecting arm and drive shaft for adjusting the stroke of the reciprocating member.

* * * * *